Figure 1:
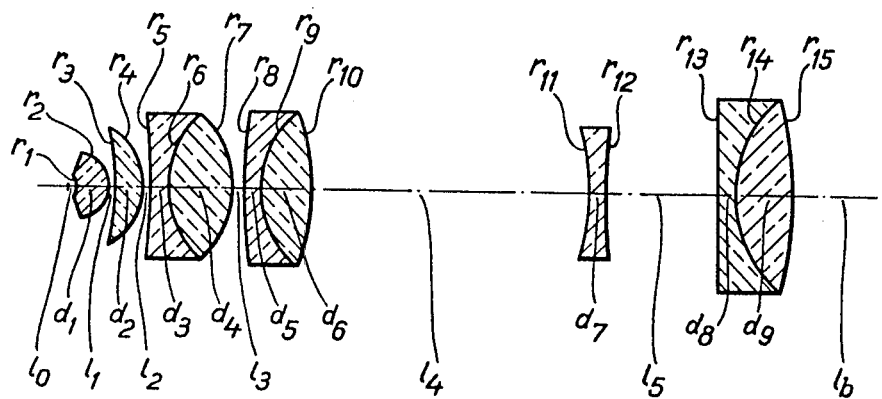

April 30, 1968          W. KLEIN          3,380,793

MICROSCOPE OBJECTIVE

Filed Sept. 5, 1963

INVENTOR
WALTER KLEIN
BY
Erich M. H. Radde
Agent

United States Patent Office 3,380,793
Patented Apr. 30, 1968

3,380,793
MICROSCOPE OBJECTIVE
Walter Klein, Wissmar, Kreis Wetzlar, Germany, assignor to Ernst Leitz G.m.b.H. Optische Werke, Wetzlar, Germany, a company of Germany
Filed Sept. 5, 1963, Ser. No. 306,759
Claims priority, application Germany, Oct. 3, 1962,
L 43,109
2 Claims. (Cl. 350—215)

The present invention relates to microscope objectives, and more particularly to the type of dry objective wherein the curvature of the field is corrected and the image field is flattened by a front lens consisting of a negative meniscus lens. The objective of this invention is designed for medium and high apertures.

Objectives of this general type are shown, for instance, in German Patents Nos. 821,126, 924,539, and 970,606, and additional objective lenses are provided in these optical systems to correct aberrations, the correction of which has been made more difficult by the addition of the negative meniscus.

It is the primary object of this invention to provide a microscope objective of this type with excellent correction of all aberrations, particularly curvature of the field and astigmatism, as well as extra-axial distortions.

In the objective shown in German Patent No. 924,539, for instance, a negative lens on the side of the image follows the two additional lenses on the side of the object, the spacing of the negative lens from the preceding lens being more than twice the focal length of the objective and the negative lens being designed primarily to correct the astigmatism of the objective. The advantages of the present invention are accomplished by a modification of this optical system wherein at least two of the additional lenses following a concavo-convex front lens of considerable thickness consist each of two cemented components, and the negative correction lens is split into a negative lens and a positive lens. The negative lens of said correction lens defines an air space with the last additional lens and the negative and positive lenses of said correction lens define air spaces therebetween, each of the latter two air spaces having an axial length at least twice the focal length of the objective. In this manner, the front lens and the additional lenses constitute the objective portion on the side of the object and the negative and positive lenses constitute the objective portion on the side of the image.

In objectives constructed in accordance with the present invention, it is easy so to control the location of the eye piece by the refractive indices of the two lenses on the image side that the focal planes on the image side are at a constant distance from the object in different objectives of a closed series of objectives. This is an important requirement particularly in top illumination miscroscopy and in phase-constant microscopy.

It is known that the first radius of the front lens meniscus becomes very small in strong microscope objectives of the described type. This results in considerable manufacturing difficulties and also makes it quite difficult to clean the front surface of the objective after its use. In an effort to flatten the front face of the front lens as much as possible, it has been proposed to enlarge the lenses in the objective portion on the side of the object, particularly the front lens, by widening the path of the bundle of rays. This widening may be effected in the microscope objectives of this invention by suitably proportioning the negative lens on the side of the image in such a manner that the objective portion on the side of the object projects the peripheral ray of the bundle of rays emanating from the center of the object at least at one point thereof at a distance from the optical axis at least one and a half times the distance of this peripheral ray from the optical axis at the exit surface of the objective portion on the side of the image.

Figure 2:
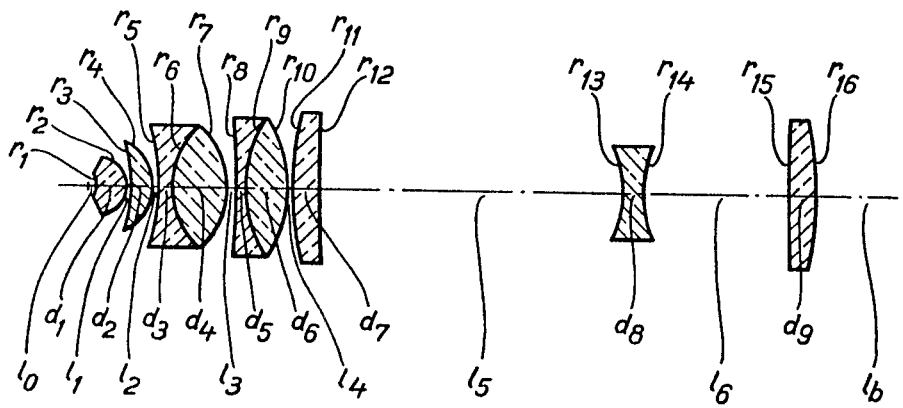

FIGURES 1 and 2 of the accompanying drawing show two preferred embodiments of the microscope objective of this invention. The following Tables I and II give the parameters of the preferred embodiments. Table I corresponds to FIG. 1, and Table II corresponds to FIG. 2. In the tables, the letters $r$ designate the successive first and second radii, taken in the direction of the glass stage supporting the object to the image, of the lenses or their components, $d$ designate the successive axial thicknesses of the lenses or their components, $l$ designate the axial lengths of the air spaces between the lenses as well as between the object and the front lens, and the last lens and the image, respectively, $n_e$ is the refractive index of the lens or lens component glasses, taken on the $e$-line, $v_e$ is the Abbe number of these glasses, $f_e$ is the focal length of the entire optical system, A is the aperture, and V is the magnification of the microscope:

TABLE I

$d$: Axial thickness of lenses  $l$: Axial length of air spaces

| Radii | | $n_e$ | $v_e$ |
|---|---|---|---|
| $r_1 = -1.14$ | $l_0 = 0.3337$ | | |
| | $d_1 = 2.26$ | 1.69400 | 54.6 |
| $r_2 = -1.885$ | $l_1 = 0.1$ | | |
| $r_3 = -14.79$ | | | |
| | $d_2 = 1.92$ | 1.48772 | 81.6 |
| $r_4 = -3.701$ | $l_2 = 0.4$ | | |
| $r_5 = -319.38$ | | | |
| | $d_3 = 1.0$ | 1.67764 | 32.0 |
| $r_6 = +5.95$ | $d_4 = 4.15$ | 1.48772 | 81.6 |
| $r_7 = -6.3$ | $l_3 = 2.1$ | | |
| $r_8 = +64.735$ | | | |
| | $d_5 = 1.0$ | 1.61771 | 50.8 |
| $r_9 = +5.54$ | $d_6 = 3.2$ | 1.48772 | 81.6 |
| $r_{10} = -13.164$ | $l_4 = 16.0$ | | |
| $r_{11} = -11.077$ | | | |
| | $d_7 = 1.0$ | 1.51000 | 60.9 |
| $r_{12} = +80.49$ | $l_5 = 7.3$ | | |
| $r_{13} = \infty$ | | | |
| | $d_8 = 1.0$ | 1.59167 | 52.9 |
| $r_{14} = +8.024$ | $d_9 = 3.5$ | 1.53604 | 51.4 |
| $r_{15} = -23.79$ | $l_6 = \infty$ | | |

$f_e = 3.1065$; $V = 80.48$; $A = 0.95$

TABLE II

$d$: Axial thickness of lenses  $l$: Axial length of air spaces

| Radii | | $n_e$ | $v_e$ |
|---|---|---|---|
| $r_1 = -1.24$ | $l_0 = 0.31295$ | | |
| | $d_1 = 1.79$ | 1.69400 | 54.6 |
| $r_2 = -1.619$ | $l_1 = 0.13$ | | |
| $r_3 = -9.331$ | | | |
| | $d_2 = 1.5$ | 1.43496 | 94.8 |
| $r_4 = -2.81$ | $l_2 = 0.26$ | | |
| $r_5 = -11.191$ | | | |
| | $d_3 = 0.7$ | 1.52520 | 50.9 |
| $r_6 = +4.88$ | $d_4 = 3.45$ | 1.43496 | 94.8 |
| $r_7 = -4.88$ | $l_3 = 0.26$ | | |
| $r_8 = -450.17$ | | | |
| | $d_5 = 0.7$ | 1.75458 | 34.8 |
| $r_9 = +7.48$ | $d_6 = 2.5$ | 1.43496 | 94.8 |
| $r_{10} = -7.48$ | $l_4 = 0.2$ | | |
| $r_{11} = +17.003$ | | | |
| | $d_7 = 1.7$ | 1.73944 | 40.8 |
| $r_{12} = +191.961$ | $l_5 = 19.9$ | | |
| $r_{13} = -6.26$ | | | |
| | $d_8 = 1.5$ | 1.73431 | 28.4 |
| $r_{14} = +8.97$ | $l_6 = 9.0$ | | |
| $r_{15} = +211.32$ | | | |
| | $d_9 = 1.5$ | 1.69416 | 30.9 |
| $r_{16} = -19.69$ | $l_b = \infty$ | | |

$f_e = 1.5799$; $V = 158.24$; $A = 0.95$

In the drawing and in Tables I and II, the axial thicknesses $d_1$ of the concavo-convex front lens are greater than either of their respective radii $r_1$ and $r_2$. Thus, in Table I, $d_1$ is 2.26, $r_1$ is 1.14 and $r_2$ is 1.885. In Table II, $d_1$ is 1.79 whereas $r_1$ is 1.24 and $r_2$ is 1.619.

I claim:

1. A microscope objective with flattened image field for producing an image of an object, comprising in the direction of the object to the image, all axial thicknesses and air space lengths being measured in units of length along the optical axis of the objective: a front lens defining an air space $l_0$ with the object and consisting of a concavo-convex lens; a first additional lens defining an air space with the meniscus lens; two additional lenses each consisting of two cemented components, the first one of said two additional lenses defining an air space with the first additional lens, and the second one of said two additional lenses defining an air space with the first one of said two additional lenses, a negative lens following the second one of the two additional lenses and defining an air space therewith and a positive lens following the negative lens and defining an air space therewith, the positive lens consisting of two compents, the radii $r$ of the lenses and their components taken in the direction of the object to the image, the successive axial thicknesses $d$ of the lenses and their components, and the axial lengths $l$ of the air spaces between the lenses as well as between the object and the front lens, and the last lens and the image being of the size given in the following table, the respective indices $n_e$ of the lens and lens component glasses, taken on the $e$ line, and the Abbe number $v_e$ of these glasses also appearing in the following table; the focal length $f_e$ of the objective being 3.1065, the aperture A being 0.95, and the magnification V being 80.48:

TABLE I $d$: Axial thickness of lenses  $l$: Axial length of air spaces

| Radii | | $n_e$ | $v_e$ |
|---|---|---|---|
| $r_1 = -1.14$ | $l_0 = 0.3337$ | | |
| | $d_1 = 2.26$ | 1.69400 | 54.6 |
| $r_2 = -1.885$ | | | |
| | $l_1 = 0.1$ | | |
| $r_3 = -14.79$ | | | |
| | $d_2 = 1.92$ | 1.48772 | 81.6 |
| $r_4 = -3.701$ | | | |
| | $l_2 = 0.4$ | | |
| $r_5 = -319.38$ | | | |
| | $d_3 = 1.0$ | 1.67764 | 32.0 |
| $r_6 = +5.95$ | | | |
| | $d_4 = 4.15$ | 1.48772 | 81.6 |
| $r_7 = -6.3$ | | | |
| | $l_3 = 2.1$ | | |
| $r_8 = +64.735$ | | | |
| | $d_5 = 1.0$ | 1.61771 | 60.8 |
| $r_9 = +5.54$ | | | |
| | $d_6 = 3.2$ | 1.48772 | 81.6 |
| $r_{10} = -13.164$ | | | |
| | $l_4 = 16.0$ | | |
| $r_{11} = -11.077$ | | | |
| | $d_7 = 1.0$ | 1.51000 | 60.9 |
| $r_{12} = +80.49$ | | | |
| | $l_5 = 7.3$ | | |
| $r_{13} = \infty$ | | | |
| | $d_8 = 1.0$ | 1.59167 | 52.9 |
| $r_{14} = +8.024$ | | | |
| | $d_9 = 3.5$ | 1.53604 | 61.4 |
| $r_{15} = -23.79$ | | | |
| | $l_b = \infty$ | | |

$f_e = 3.1065$; $V = 80.48$; $A = 0..95$.

2. A microscope with flattened image field for producing an image of an object, comprising in the direction of the object to the image, all axial thicknesses and air space lengths being measured in units of length along the optical axis of the objective: a front lens defining an air space $l_0$ with the object and consisting of a concavo-convex lens; a first additional lens defining an air space with the meniscus lens; two additional lenses each consisting of two cemented components, the first one of said two additional lenses defining an air space with the first additional lens, and the second one of said two additional lenses defining an air space with the first one of said two additional lenses; a further additional lens defining an air space with the second one of the two additional lenses, a negative lens following said further additional lens and defining an air space therewith; and a positive lens following the negative lens and defining an air space therewith; the radii $r$ of the lenses and their components taken in the direction of the object to the image, the successive axial thicknesses $d$ of the lenses and their components, and the axial lengths $l$ of the air spaces between the lenses as well as between the object and the front lens, and the last lens and the image being of the size given in the following table, the refractive indices $n_e$ of the lens and lens component glasses, taken on the $e$ line, and the Abbe number $v_e$ of these glasses also appearing in the following table, the focal length $f_e$ of the objective being 1.5799, the aperture A being 0.95, and the magnification V being 158.24.

TABLE II $d$: Axial thickness of lenses  $l$: Axial length of air spaces

| Radii | | $n_e$ | $v_e$ |
|---|---|---|---|
| | $l_0 = 0.31295$ | | |
| $r_1 = -1.24$ | | | |
| | $d_1 = 1.79$ | 1.69400 | 54.6 |
| $r_2 = -1.619$ | | | |
| | $l_1 = 0.13$ | | |
| $r_3 = -9.331$ | | | |
| | $d_2 = 1.5$ | 1.43496 | 94.8 |
| $r_4 = -2.81$ | | | |
| | $l_2 = 0.26$ | | |
| $r_5 = -11.191$ | | | |
| | $d_3 = 0.7$ | 1.52520 | 50.9 |
| $r_6 = +4.88$ | | | |
| | $d_4 = 3.45$ | 1.43496 | 94.8 |
| $r_7 = -4.88$ | | | |
| | $l_3 = 0.25$ | | |
| $r_8 = -450.17$ | | | |
| | $d_5 = 0.7$ | 1.75458 | 34.8 |
| $r_9 = +7.48$ | | | |
| | $d_6 = 2.5$ | 1.43496 | 94.8 |
| $r_{10} = -7.48$ | | | |
| | $l_4 = 0.2$ | | |
| $r_{11} = +17.003$ | | | |
| | $d_7 = 1.7$ | 1.73944 | 40.8 |
| $r_{12} = +191.961$ | | | |
| | $l_5 = 19.9$ | | |
| $r_{13} = -6.26$ | | | |
| | $d_8 = 1.5$ | 1.73431 | 28.4 |
| $r_{14} = +8.97$ | | | |
| | $l_6 = 9.0$ | | |
| $r_{15} = +211.32$ | | | |
| | $d_9 = 1.5$ | 1.69416 | 30.9 |
| $r_{16} = -19.69$ | | | |
| | $l_b = \infty$ | | |

$f_e = 1.5799$; $V = 158.24$; $A = 0.95$.

References Cited

UNITED STATES PATENTS 1,761,441  6/1930  Foster _____ 88—57

JEWELL H. PEDERSEN, *Primary Examiner*.

R. I. STERN, *Assistant Examiner*.